United States Patent
Storer et al.

(10) Patent No.: US 6,763,555 B2
(45) Date of Patent: Jul. 20, 2004

(54) UNI-DIRECTIONAL WORM DRIVE CLAMP

(75) Inventors: C. Kenneth Storer, Columbus, OH (US); Preston D. Cook, deceased, late of Columbus, OH (US), by Helen S. Cook, Executrix

(73) Assignee: The United Seal Company, Columbus, OH (US)

( * ) Notice: Subject to any disclaimer, the term of this patent is extended or adjusted under 35 U.S.C. 154(b) by 0 days.

(21) Appl. No.: 10/067,195

(22) Filed: Feb. 7, 2002

(65) Prior Publication Data

US 2003/0145436 A1 Aug. 7, 2003

(51) Int. Cl.⁷ .............................................. F16L 33/08
(52) U.S. Cl. ................................................... 24/274 R
(58) Field of Search ...................... 24/274 R–274 WB, 24/30.5 P, 279

(56) References Cited

U.S. PATENT DOCUMENTS

| | | | | |
|---|---|---|---|---|
| 1,992,505 A | * | 2/1935 | Prosky ..................... 24/274 R |
| 2,504,836 A | * | 4/1950 | Hill ........................... 24/274 R |
| 2,522,494 A | * | 9/1950 | Baldo ....................... 24/274 R |
| 3,311,399 A | * | 3/1967 | Holton ..................... 294/31.2 |
| 4,021,892 A | * | 5/1977 | Piper ........................ 24/274 R |
| 4,047,268 A | | 9/1977 | Buttriss ....................... 24/274 |
| 4,197,620 A | | 4/1980 | Heuchert ..................... 24/274 |
| 4,221,030 A | | 9/1980 | Bernede ...................... 24/274 |
| 4,300,270 A | * | 11/1981 | Sauer ...................... 24/274 R |
| 4,303,216 A | | 12/1981 | Hollingsead ................. 248/74 |
| 4,537,432 A | * | 8/1985 | Meeks ........................ 292/318 |
| 4,558,493 A | | 12/1985 | Dowdell ..................... 24/274 |
| 4,686,747 A | | 8/1987 | Bakdahl ..................... 24/274 |
| 4,993,124 A | | 2/1991 | Ouimet ........................ 24/274 |
| 5,315,737 A | | 5/1994 | Ouimet ........................ 24/274 |
| 5,419,599 A | * | 5/1995 | Georgopoulos ............. 292/326 |
| 6,000,736 A | * | 12/1999 | Leon et al. ................. 292/326 |

FOREIGN PATENT DOCUMENTS

EP          889272 A1 * 1/1999  ........... F16L/33/08

* cited by examiner

Primary Examiner—James R. Brittain
(74) Attorney, Agent, or Firm—Vorys, Sater, Seymour and Pease LLP

(57) ABSTRACT

A worm drive clamp comprises a worm drive member and a unitary strap and housing member. The worm drive member has a cylindrical body with a thread, a pawled portion below the body, and a head suitable for turning by a driver such as a hex nut driver. The worm drive member is situated in a chamber defined by the housing. The bottom wall of the housing has a ratcheted recess that interacts with the pawled portion to prevent counterclockwise rotation of the drive member. As the strap is passed upwards through a slot in the housing, grooves on the strap engage the thread of the worm drive member so that the strap is drawn upwards as the worm drive member is rotated clockwise.

1 Claim, 5 Drawing Sheets

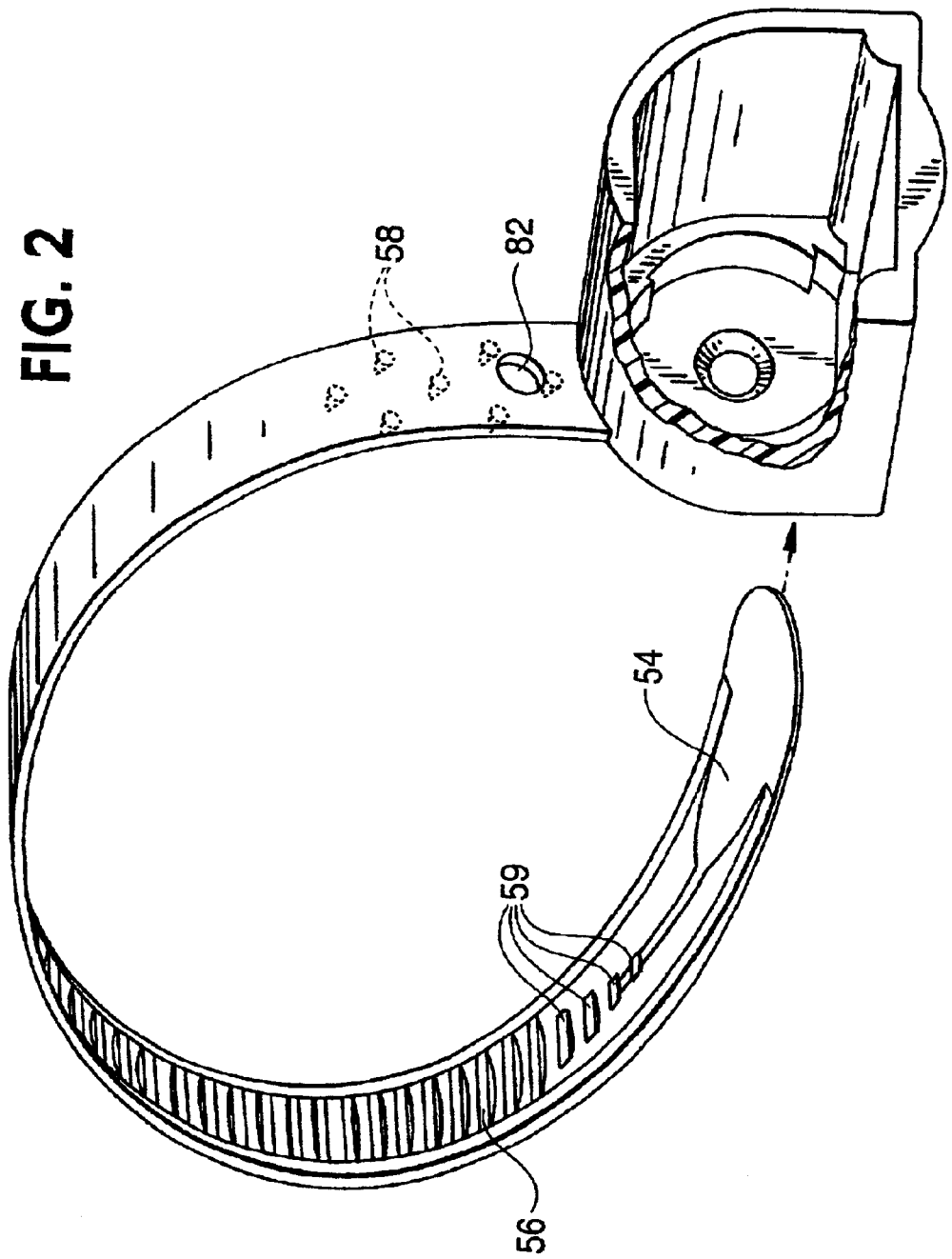

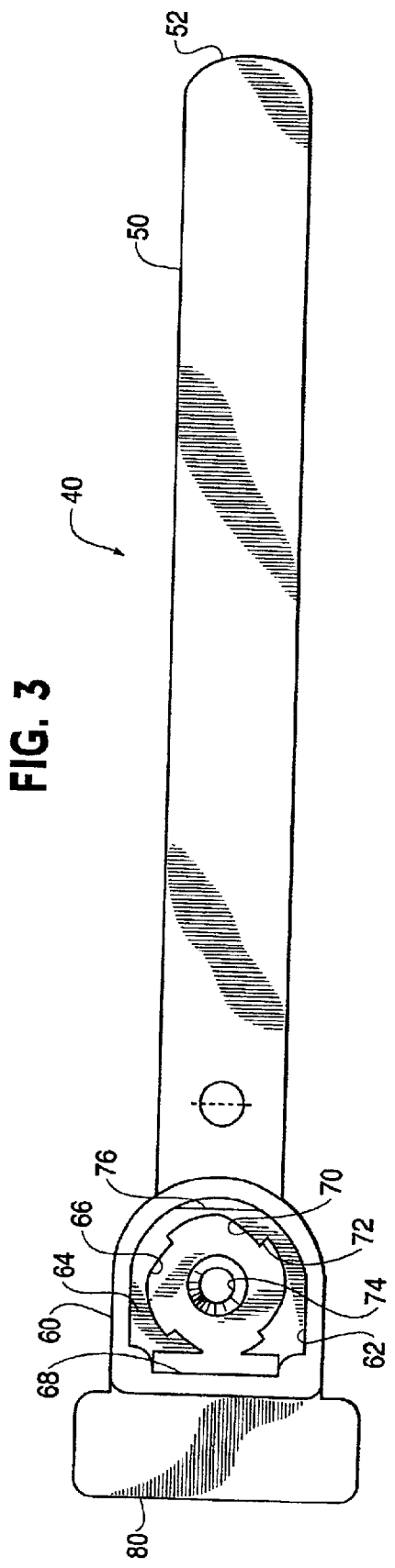

UNI-DIRECTIONAL WORM DRIVE CLAMP

FIELD OF THE INVENTION

This invention relates to clamping devices of the worm drive type, and specifically, to a clamping device having a worm drive that is capable only of being tightened, and which cannot be loosened.

BACKGROUND OF THE DISCLOSURE

Worm drive clamps are used in a wide variety of industrial and other applications to tighten and loosen a band or strap in a circular direction. Such clamps may be used, for example, to provide a tight closure between two nesting tubes of similar, but slightly different, diameter, or to close a container having a flexible opening. A worm drive clamp typically comprises a worm drive member, or gear, having a spiral thread, a housing in which to situate the worm drive member, and a flexible strap that is fed through the housing and that has grooves or slots provided thereon that engage the spiral thread and cause the clamp to be tightened as the worm drive member is rotated.

Of particular interest to the present application is the use of worm drive clamps to close securely currency bags. These bags, typically made of a heavy cloth such as burlap, are used by banks and other financial institutions to transport hard currency, typically from one branch to another. Because these bags are filled by hand by bank or security personnel, it is important that the clamp be capable of being closed and sealed in an easy and efficient manner. Yet, given the application, it also is important that the clamp, once tightened, not be prone to being loosened while in transit.

There also exists a need in applications involving cloth or otherwise flexible containers for a clamp having a secondary hold on the container. Particularly with respect to thin plastic containers such as refuse bags, a clamp that appears to be fully tightened may later be effectively loosened as portions of the plastic gathered against each other by the clamp slip outside of the clamp.

In addition, since currency bags are re-used and different denominations of currency may be carried by the same bag at different times, it would be advantageous for the worm drive clamp to be able to indicate the contents of the bag. It also would be advantageous to keep to a minimum the number of separate parts required for the clamp.

Accordingly, it is an object of the present invention to provide a worm drive clamp suitable for closing the open end of a flexible container such that the clamp may be tightened, but may not be loosened.

It as another object of the present invention to provide a worm drive clamp having a strap and housing comprising a unitary member.

It is a further object of the present invention to provide a worm drive clamp having a strap that includes a tab portion to permit easy identification of the contents of the container sealed by the clamp.

It is a further object of the invention to provide a worm drive clamp having a strap that has penetrating members disposed on its inner surface such that as the clamp is tightened the penetrating members will pierce or otherwise lodge in the container material to hinder portions of the container material from accidentally slipping free from the clamp.

SUMMARY OF THE INVENTION

The foregoing objects are achieved in the present invention by a worm drive clamp comprising a worm drive member and a unitary strap and housing member. The worm drive member has a body with a spiral thread, a head above the body, a pawled portion below the body, and, preferably, a knob disposed below the pawled portion. The housing has a ratcheted recess adapted to engage the pawled portion of the worm drive member, as well as slot for receiving the end of the strap. The housing also has, preferably, a hole in its bottom wall to allow penetration by the knob of the worm drive member.

The end of the strap is inserted into the slot until grooves provided on its inner surface engage the thread on the body of the worm drive member. Then, as the head is rotated clockwise, the thread acts to pull the strap further through the slot, tightening the clamp. Meanwhile, the pawled portion of the worm drive member is engaged with the ratcheted recess of the housing so as to prevent rotation in the opposite direction. Thus, the clamp may be tightened but it may not be loosened.

BRIEF DESCRIPTION OF THE DRAWINGS

The preferred embodiments of the present invention will now be described with reference to the accompanying drawings, in which:

FIG. 2 is a perspective view of a unitary strap and housing member of an embodiment of the present invention;

FIG. 3 is a top view of the unitary strap and housing member shown in FIG. 2;

DETAILED DESCRIPTION OF THE PREFERRED EMBODIMENTS

Figure 1:
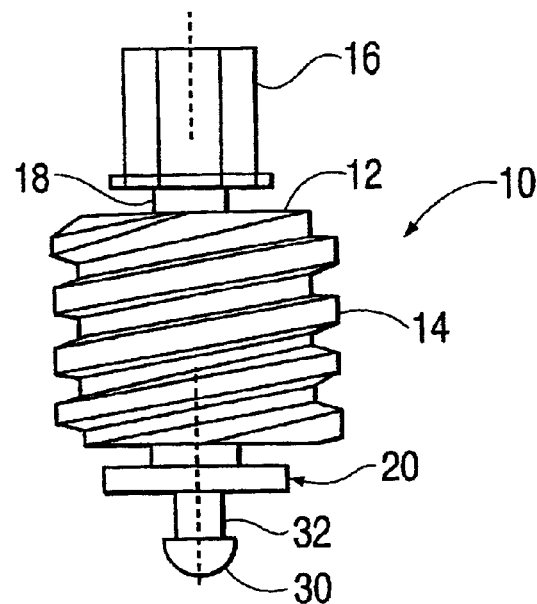
FIG. 1 is a side view of a worm drive member of an embodiment of the present invention.

Referring now more particularly to the drawings, FIG. 1 shows a worm drive member 10. Worm drive member 10 is preferably made from any thermo plastic that would be suitable for use as a worm drive as would be apparent to one of ordinary skill in the art, although it alternatively could be cast or otherwise formed from metal. The worm drive member is disposed along an axis of rotation and comprises a substantially cylindrical body 12 with a spiral thread 14 on its outer surface, and a head 16 above body 12, either situated directly on top of the body or preferably, as shown, connected by a neck 18. When the neck construction is used, a further advantage to the invention may be realized, as described below. Head 16 is shown as comprising a hex bolt head suitable for engagement and rotation by a hex head driver or wrench. Of course, it will readily be appreciated that head 16 may comprise any known form of bolt or screw, such as a flat screw or a Phillips head screw, to be rotated with an appropriate driver.

Figure 4:
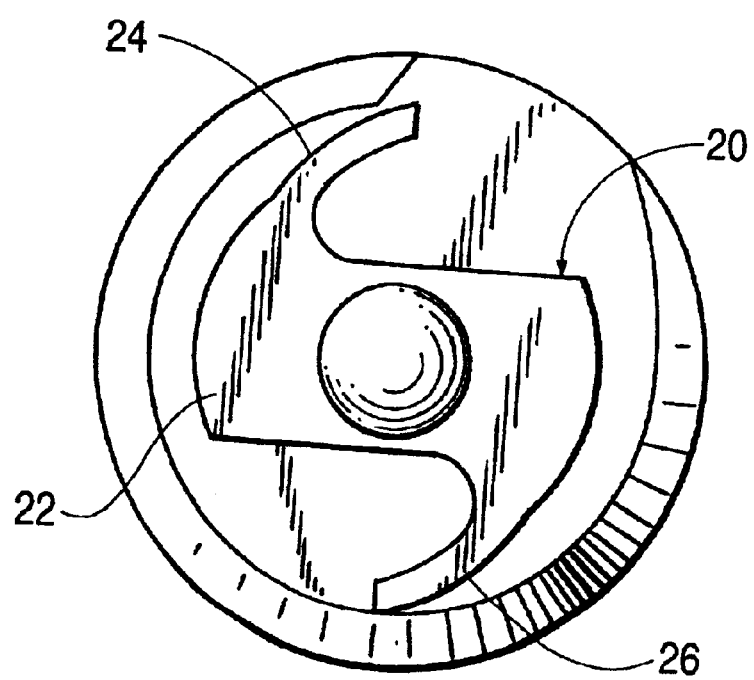
FIG. 4 is a bottom view of the worm drive member shown in FIG. 1.

The worm drive member further comprises a pawled portion 20 disposed below the body 12. As shown in FIG. 4, viewed from below the body, the pawled portion comprises a diametric bar 22 with pawls 24 and 26 disposed at the outer ends thereof. The preferred embodiment shown in FIG. 4 uses two pawls, although a single pawl or more than two pawls could be used. The pawled portion engages with a ratcheted recess in the housing to prevent loosening of the clamp, as will be described below.

The worm drive member may also preferably comprise a knob 30 disposed below the pawled portion and connected to the pawled portion by a shaft 32. Knob 30 is sized and shaped to fit compressedly through a hole in the bottom wall of the housing, as will be described below.

Referring to FIGS. 2 and 3, unitary strap and housing member 40 comprises a flexible strap 50 with a housing 60 disposed toward one of its ends. The housing defines a chamber 62, open at the top, that is adapted to hold the worm drive member. As more clearly shown in FIG. 3, the housing has a bottom wall 64, which in turn has a recess 66 and a slot 68. Recess 66 is in the form of a ratchet, comprising substantially arcuate wall sections 70 interrupted by steps 72 in an inwardly radial direction. Steps 72 may face either clockwise or counterclockwise depending upon the orientation of the pawls in the pawled portion of the worm drive member. In the embodiment shown, when viewed from the top of the housing, the steps face clockwise so as to prevent counterclockwise rotation of the worm drive member. The walls of recess 66 may be continuous or, as shown in FIG. 3, they may comprise a plurality of sections interrupted by the slot or slots.

Bottom wall 64 of housing 60 may also preferably include a through-hole 74 disposed centrally in recess 66 to elastically expand and allow knob 30 to be inserted therethrough, so that bottom wall 64 will be held between knob 30 and pawled portion 20 of worm drive member 10. This construction allows for worm drive member 10 to be secured temporarily in the housing until the clamp is tightened, as described below. For more permanent securing of the worm drive member before tightening of the clamp, housing 60 may also include lip 76 disposed at the upper end of the housing on a side diametrically opposite that of slot 68 (though the lip may be disposed at another location at the upper end of housing 60 so long as it does not interfere with the drawing of strap 50 through slot 68). Lip 76 is disposed to project far enough into chamber 62 to engage thread 14, so that when the worm drive member is inserted into the housing, lip 76 acts to prevent the worm drive member from being removed, even before the strap is drawn through the slot 68.

Figure 5:
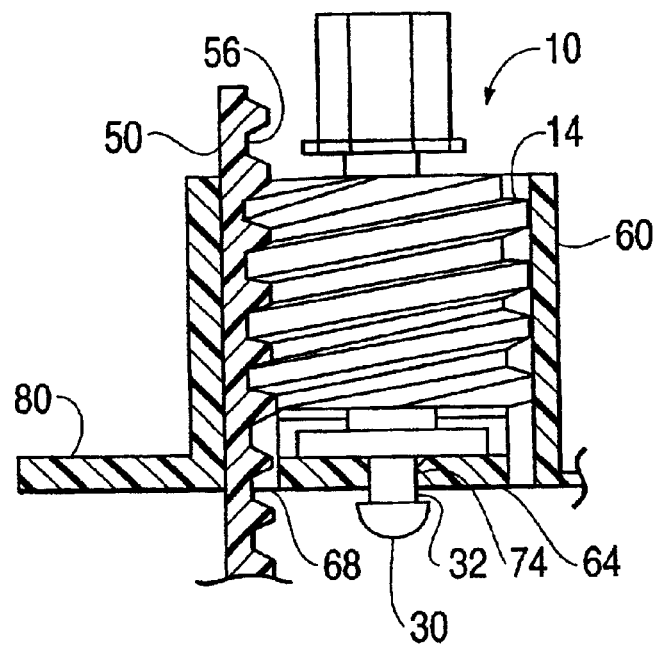
FIG. 5 is a cross-sectioned view of the worm drive member of FIG. 1 in engagement with the strap and housing member of FIG. 2.

Strap 50 has a second end 52 which is to be inserted into slot 68 from below the bottom wall of housing 60. An indication may be molded into or heat stamped onto the bottom wall near the slot to indicate the proper direction of insertion. When second end 52 of strap 50 is so inserted, a substantially circular enclosure is defined, in which the open end of the container is to be gathered and closed as the strap is pulled upward through the slot and the enclosure is tightened. The surface of the strap facing the interior of the circular enclosure is referred to as the inner surface 54 of the strap. As shown in FIG. 2, inner surface 54 is provided with a plurality of lateral grooves 56 at an angle such that when the strap is inserted in the slot and the inner surface faces the interior of chamber 62, the grooves interface with spiral thread 14, as shown in FIG. 5. The grooves are shown as penetrating only partially into strap 50. However, if desirable, the grooves could penetrate all the way through to the outer surface of strap 50 so as to form lateral slots.

Figure 6:
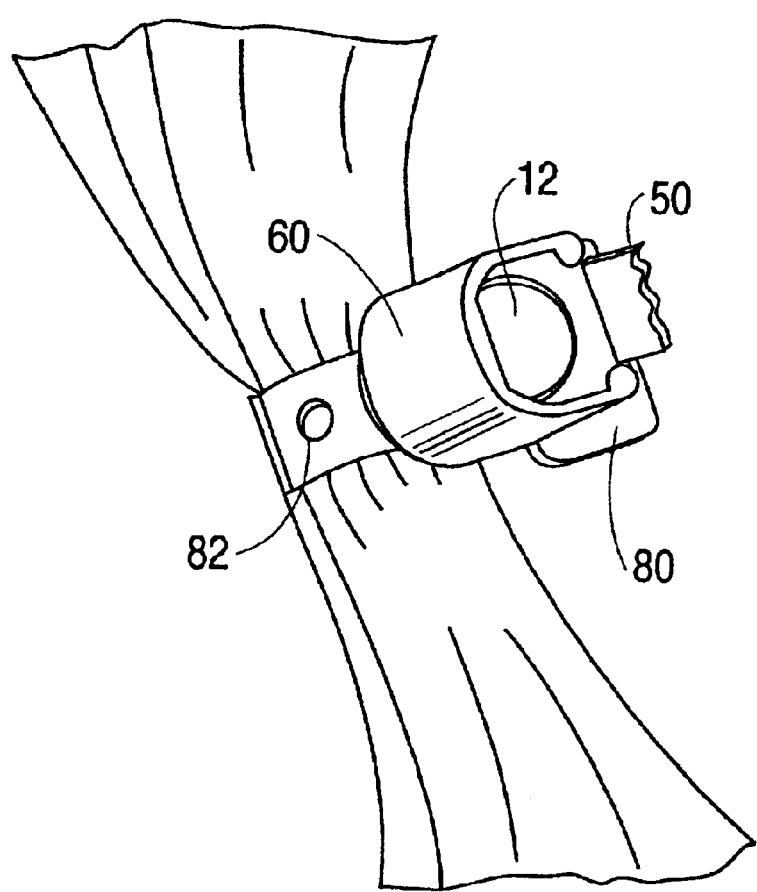
FIG. 6 is a perspective view of an embodiment of the worm drive clamp of the present invention tightened about a bag.

As head 16 is rotated clockwise, thread 14 acts with grooves 56 to pull strap 50 further through slot 68, tightening the enclosure about the container, as shown in FIG. 6. (In the preferred embodiment shown, consistent with ordinary practice in the drive member art, the worm drive clamp is constructed so that clockwise rotation tightens the clamp and counterclockwise rotation is prevented. The subject invention, however, may also be embodied so that counterclockwise rotation tightens the clamp and clockwise rotation is prevented. The terms "clockwise" and "counterclockwise" and any other related terms appearing in the claims are to be interpreted to allow for such embodiments.) Once the strap has been drawn upward and the clamp tightened sufficiently, that portion of the strap extending upward from the housing may be cut with shears or another suitable tool to reduce interference. When it is desired to remove the clamp and open the container, the strap surrounding the container is cut.

Several additional preferred enhancements to the invention are also shown. As shown in FIG. 2, inner surface 54 of strap 50 may be provided with penetrating members such as spikes 58 between the housing and the lateral grooves. These members are disposed to penetrate and become embedded in the material comprising the open ended container as the clamp is tightened so that the material will be less likely to be removed from the clamp if pulled from below. This enhancement is especially useful if the container is a cloth currency bag or a thin plastic refuse bag.

The inner surface of the strap may also be provided with one or more lateral indentations 59 disposed between the plurality of lateral grooves 56 and the second end of the strap. These indentations are slightly notched so as to temporarily hold the strap in place when it is first inserted through slot 68 until the clamp is tightened by rotating the head 16.

The end of the strap where the housing is disposed may also be provided with a tab portion 80, as shown in FIG. 3. The tab portion may be used as a tag to provide information about the contents of the bag. The identifying information may be molded into or heat stamped onto the tab, or the tab may be provided with a smooth surface suitable for adhering a sticker or other form of printed information. Alternatively or additionally, strap 50 may be provided with hole 82 between the grooves and the housing, through which a wire twist tie or the like with relevant information may be attached prior to tightening.

In addition, when head 16 is connected to body 12 by neck 18, a further advantage may be realized. As head 16 is rotated and the strap is drawn upward through slot 68, the clamp tightens. Eventually, the clamp will be tightened to a point where further drawing upward of the strap is not possible. If sufficient clockwise rotational pressure continues to be applied to the head, torque forces will build on drive member 10 until head 16 snaps off at neck 18. When the head has been snapped off in this manner, a user may tell from a glance at the clamp that it has been maximally tightened.

It should be understood that the present invention is not limited to any of the specific embodiments discussed or shown herein, but that the invention is to be defined in accordance with the following claims.

We claim:

1. A worm drive clamp comprising:

a worm drive member having a body with at least one spiral thread on an outer surface thereof, a head disposed above an upper end of said body, and a pawled portion disposed below a lower end of said body; and a flexible strap having a housing adapted to receive said drive member disposed toward a first end thereof, said strap being provided with a plurality of grooves on an inner surface thereof and with one or more indentations disposed between said grooves and a second end thereof to temporarily hold said strap in engagement with said thread prior to rotation of said head, wherein said housing has a ratcheted recess in a bottom wall thereof adapted to engage said pawled portion when said drive member is situated in said housing, and a slot in said bottom wall adapted to receive said second end of said strap; and as said second end of said strap is inserted upward through said slot when said drive member is situated in said housing, said grooves engage said thread, such that as said worm drive member is rotated clockwise, said strap is drawn further upward through said slot, while said pawled portion is engaged by said ratcheted recess to prevent counterclockwise rotation.

* * * * *